Jan. 16, 1923.
S. KAWANISHI.
TIRE.
FILED AUG. 6, 1919.
1,442,073.
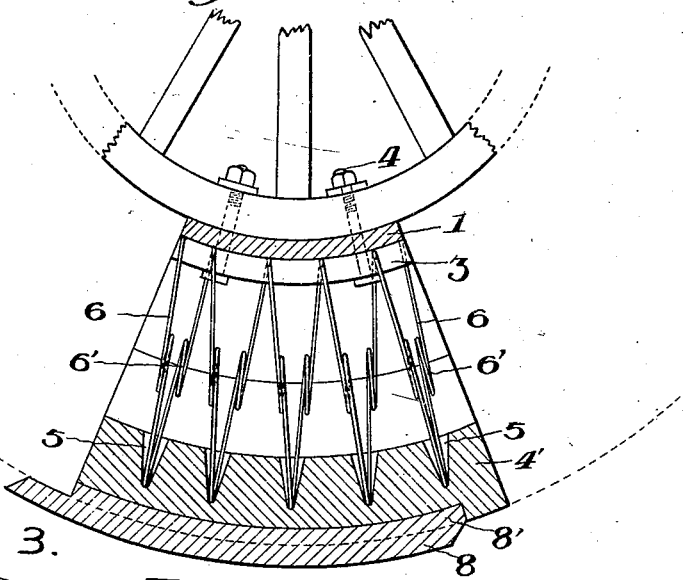
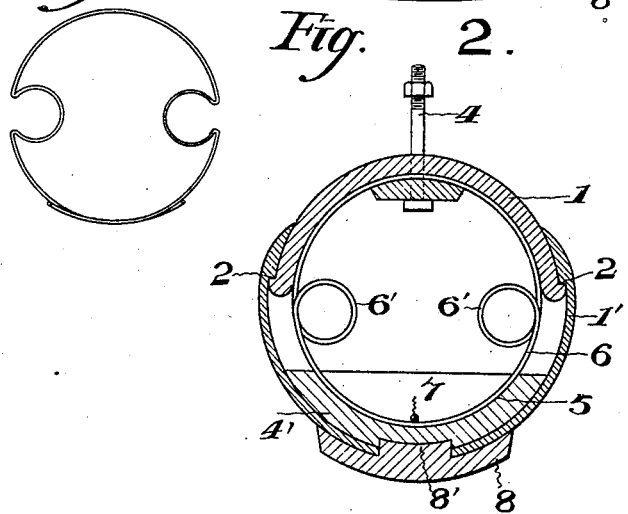
INVENTOR
Sadagiro Kawanishi
BY
B. Singer
ATTORNEY Patented Jan. 16, 1923.

1,442,073

UNITED STATES PATENT OFFICE.

SADAGIRO KAWANISHI, OF TOKYO, JAPAN.

TIRE.

Application filed August 6, 1919. Serial No. 315,698.

*To all whom it may concern:*

Be it known that I, SADAGIRO KAWANISHI, a subject of the Emperor of Japan, and a resident of No. 117 Shimo-Shibuya, Shibuya-Machi, Toyotama-Gun, Tokyo, Empire of Japan, have invented new and useful Improvements in Tires, of which the following is a specification.

The present invention relates to improvements in tires for motor vehicles and the like of which the outer casing comprises a plurality of parts or sections consisting of two members, approximately semi-tubular in shape, arranged in partly overlapping relation and for movement one toward and from the other, said members being provided with mutually engaging flanges to limit the outer movement of the outer member, springs arranged in said members and means to secure one of said members on a wheel rim.

The object of the invention is to provide a tire of this character which will be at once economical, durable and efficient, and readily re-treadable by simply removing locally damaged parts only and substituting them with new ones, and generally to obtain a strong tire which will behave like pneumatic tires.

In the accompanying drawings a preferred embodiment of my invention is illustrated, in which:

Fig. 1 is partly an elevation and partly a section of a portion of a wheel provided with a tire constructed and arranged in accordance with my invention.

Fig. 2 is a cross section thereof.

Fig. 3 shows a modification of the spiral spring used.

Referring to the drawings the metallic outer cover or jacket is composed of two semi-tubular parts, inner and outer halves, 1, 1', respectively, so that when assembled these two members will form one complete tubular casing, said members being arranged in partially overlapping relation and for movement one toward and from the other, and being provided with mutually engaging flanges 2 to limit the outer movement of the outer member 1'. Each of the members 1, 1', is made in sections having radially extending abutting ends. The sections of the member 1' yield locally. The members 1 and 1' may be held in position by any suitable means, such as the bolts 4.

The member 1 is arranged around the rim of the wheel and in the said member is a device which I call a "bolting-seat" 3, which is preferably made of wood and is secured to the rim by bolts 4 which also pass through said member 1 so that said member and bolting-seat are firmly secured in place.

The member 1' is also mounted by a fixing piece which in order to distinguish from the aforesaid bolting-seat is called hereinafter a spring-seat 4' and which is likewise made of wood or other like material, having a convex surface to conform with the corresponding contour of the inner surface of the member 1'. This latter seat 4' is provided upon its inner side with a series of spaced grooves 5 adapted to engage with and receive therein each convolution of a coil spring 6, which is internally disposed and extends between the members 1, 1'.

The spring 6 is conveniently made of wire and is provided with inwardly extending rings formed by circularly bending the integral portion of the spring proper at diametrically opposite points, thereby providing for every convolution of the spiral two opposed rings, as at 6'.

The outer sides of the coils of the spring 6 are arranged and held in spaced relation in the grooves 5 of the seat 4', and are secured in place by a pin 7. The inner sides of the coils of the spring are engaged in the grooves of the bolting-seat 3 and held in place thereby.

Conveniently there may be incorporated a suitable protective member preferably in the form of a band 8 having a projection 8' adapted to engage a corresponding groove which is provided for the purpose upon the tread of the casing. Said band, as here indicated in Fig. 1, is composed of segmental members arranged in partial overlapping relation. Where desired to run a long distance or to offer an efficient resistance to sharp objects on the road preferably this band will take the form of a metallic band, whilst a rubber band is more suitable when desired to prevent noise when running. Any suitable means may be employed for holding the tread 8 in place.

If preferred, instead of forming the attendant rings completely circular in the aforesaid manner, a small portion of the arc may be left open as shown in Fig. 3.

Having described my invention what I claim is:—

1. A tire comprising a pair of substantially semi-tubular members arranged in partially overlapping relation and for movement one toward and from the other, said members being provided with mutually engaging flanges to limit the outer movement of the outer member, and a coiled spring in said members and a fastening member in one of said members to secure the same on a wheel rim, said fastening member having grooves through which the convolutions of said coiled spring extend so that said fastening member also secures the convolutions of the spring in place.

2. A tire comprising a pair of substantially semi-tubular members arranged in partially overlapping relation and for movement one toward and from the other, said members being provided with mutually engaging flanges to limit the outer movement of the outer member, and a coiled spring in said members and a fastening member in one of said members to secure the same on a wheel rim, said fastening member having grooves through which the convolutions of said coiled spring extend so that said fastening member also secures the convolutions of the spring in place, and a member in the outer tire member and also having grooves in which the convolutions of the spring are arranged.

In testimony whereof I affix my signature in presence of two witnesses.

SADAGIRO KAWANISHI.

Witnesses:
   H. YASUMURA,
   J. KAMEDO.